United States Patent [19]
Padzensky

[11] Patent Number: 6,098,092
[45] Date of Patent: *Aug. 1, 2000

[54] SERVER TO DYNAMICALLY GENERATE GRAPHICS FOR THE WORLD WIDE WEB

[75] Inventor: David Jay Padzensky, Campbell, Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,378

[22] Filed: Nov. 8, 1996

[51] Int. Cl.[7] .................................................. G06F 17/30
[52] U.S. Cl. ........................... 709/203; 709/221; 707/203
[58] Field of Search ............................... 395/200.33, 157, 395/155, 800, 712, 182.06, 806, 615, 326; 345/428, 440, 355, 419; 128/660.01; 709/203, 221; 707/203; 434/118

[56] References Cited

U.S. PATENT DOCUMENTS

| | | | |
|---|---|---|---|
| 5,204,947 | 4/1993 | Berstein et al. ........................ | 395/157 |
| 5,276,789 | 1/1994 | Besaw et al. ........................... | 395/140 |
| 5,359,710 | 10/1994 | Aono et al. ............................. | 395/155 |
| 5,619,710 | 4/1997 | Travis, Jr. et al. ..................... | 395/800 |
| 5,649,186 | 7/1997 | Ferguson ................................. | 395/610 |
| 5,657,460 | 8/1997 | Egan et al. .............................. | 395/326 |
| 5,715,823 | 2/1998 | Wood et al. ........................ | 128/660.01 |
| 5,729,741 | 3/1998 | Liaguno et al. ........................ | 395/615 |
| 5,732,216 | 3/1998 | Logan et al. ........................ | 395/200.33 |
| 5,764,235 | 6/1998 | Hunt et al. .............................. | 345/428 |
| 5,791,992 | 8/1998 | Crump et al. ............................ | 463/41 |
| 5,793,966 | 8/1998 | Amstein et al. .................. | 395/200.33 |
| 5,819,302 | 10/1998 | Nielsen .................................. | 707/523 |
| 5,822,511 | 10/1998 | Kashyap et al. .................... | 395/182.06 |
| 5,823,781 | 10/1998 | Hitcock et al. ......................... | 434/118 |
| 5,828,887 | 10/1998 | Yeager et al. ........................... | 395/712 |
| 5,832,271 | 11/1998 | Devanbu ................................. | 395/705 |
| 5,835,911 | 11/1998 | Nakagawa et al. ..................... | 707/203 |
| 5,845,084 | 12/1998 | Cordell et al. .......................... | 709/234 |
| 5,848,291 | 12/1998 | Milne et al. ............................. | 395/806 |
| 5,848,427 | 12/1998 | Hyodo .................................... | 707/513 |
| 5,870,559 | 2/1999 | Leshem et al. ......................... | 709/224 |
| 5,880,740 | 3/1999 | Halliday et al. ........................ | 345/435 |
| 5,884,056 | 3/1999 | Steele ..................................... | 395/339 |
| 5,886,709 | 3/1999 | Willman ................................. | 345/440 |
| 5,926,179 | 7/1999 | Matsuda et al. ........................ | 345/355 |
| 5,956,038 | 9/1999 | Rekimoto ............................... | 345/419 |

OTHER PUBLICATIONS

CGM, Graphcap and Fontcap Supplement, Fred Clare. [http://ngwww.sis.ucar.edu/ngdoc/ng4.1alpha/supplements/cgm_supp/cgm_supp.html], Jun. 21, 1995.

DATAPLOT, Overview, S.Baum [www.llp.fu–berlin.de/baum/DATAPLOT/], Mar. 25, 1996.

*Primary Examiner*—Framk J. Asta
*Assistant Examiner*—Thong Vu
*Attorney, Agent, or Firm*—Wagner, Murabito & Hao LLP

[57] ABSTRACT

A method and arrangement for dynamically generating computer displayable graphics for the World Wide Web is provided. Upon receiving a request from an end user over the web, a server executes a program stored in its memory to retrieve data from a selected data source such as a continuously updated data base. Next, the server executes a second program stored in its memory using the data retrieved as input to generate computer graphics. The second program is written in a flexible and easy to use general purpose graphics generating programming language. The server sends the computer graphics generated over the World Wide Web to the end user who requests it.

27 Claims, 16 Drawing Sheets

```
%{
#include <string.h>
#include <stdio.h>
#include "y.tab.h"
%} num            -?[0-9]+(\.[0-9]+)?
strlit         \"[^"]*\"
line           [Ll][Ii][Nn][Ee]
comment        \#.*

%%

[Hh]{line}              { return Hline ; }
[Vv]{line}              { return Vline ; }
[Pp][Ll][Oo][Tt]        { return Plot ; }
[Tt][Oo]                { return To ; }
[Dd][Rr][Aa][Ww]        { return Draw ; }
[Aa][Tt]                { return At ; }
[Ii][Nn][Ii][Tt]        { return Init ; }
[Cc][Oo][Ll][Oo][Rr]    { return Color ; }
[Ff][Ii][Ll][Ll]        { return Fill ; }
[Aa][Rr][Cc]            { return Arc ; }
[Cc][Ii][Rr][Cc][Ll][Ee]  { return Circle ; }
[Oo][Rr][Ii][Gg][Ii][Nn]  { return Origin ; }

{num}          { yylval.num = atoi (yytext) ;
                 return Num ; }

{strlit}       {   yylval.str = (char *)malloc (yyleng - 1) ;
                   strncpy(yylval.str,yytext + 1, yyleng - 2) ;
                   yylval.str[yyleng - 2] = '\0' ;
                   return Strlit ; }

[,()=]         { return yytext[0] ; }

[\r\t\n]       { /* Ignore */ }
{comment}      { /* Ignore */ }
%%

Int yywrap ()  { return 1 ; }
```

FIGURE 3

```
% {
#define YYERROR_VERBOSE
#include "picmaker.h"
% }
% union {
   char *str ;
   int num ;
}
%token <str> Strlit
%token <num> Num
%token Hline Vline Plot To At Draw Init Color Fill Arc Circle Origin
%type <num> density_opt
% %
input :         valid_cmd input
              | NULL
;
valid_cmd :    Init Num ',' Num                         { picture = (rgb * ) mall
                                                            width = $2 ; height = $4 ;
                                                            xoffset = yoffset = 0 ;
                                                            bzero (picture, picsize )
             | Hline density_opt Num ',' Num At Num    { hline ($7, $3, $5, $2) ; }
             | Vline density_opt Num ',' Num At Num    { vline ($7, $3, $5, $2) ; }
             | Plot Num ',' Num                         { plot ( $2, $4 ) ; }
             | Plot Num ',' Num To Num ',' Num          { drawline ( $2, $4 , $6, $8 ) ;
             | Draw density_opt Strlit At Num ',' Num   { drawstring ( $5, $7, $2, $
             | Color ' = ' Num ',' Num ',' Num          { Color.r = $3 ; color.g
             | Fill Num ',' Num                          { int xo, yo ;
                                                            xo = xoffset ;
                                                            yo = yoffset ;
                                                            xoffset = 0 ;
                                                            yoffset = 0 ;
                                                            fill ( $2 + xo, $4 + yo ) ;
                                                            xoffset = xo ;
                                                            yoffset = yo ; }
             | Arc density_opt Num ',' Num ',' Num ',' Num ',' Num    {arc ( $2
                                                            { arc ($2, $3, $5, $7, $9, $11
             | Circle density_opt Num ',' Num ',' Num
             | Origin Num ',' Num                       { xoffset = $2 ;
                                                            yoffset = $4 ; }
;
density_opt :   '(' Num ')'             { $$ = $2 ; }
              | NULL                    { $$ = 1 ; }
;
NULL :
;
% %
yyerror (char * s ) {
   fprintf (stderr, " % s\ n " , s) ;
}
```

FIGURE 4

```
CFLAGS = - O
 picmaker : initfont.o picmaker.o lex.yy.o y.tab.o
        cc -o picmaker initfont.o picmaker.o lex.yy.o y.tab.o  -lm lex.yy.c :  lex.l y.tab.c
        lex -Qy  lex.l y.tab.c :  parser.y
        yacc -v  -d  -t   -Qy parser.y clean :
        -rm  *  ~  *.bak  *.o
        -rm core lex.yy.c  y.tab.c  y.tab.h  y.output
```

FIGURE 5

```
# include <bstring.h>
# include "initfont.h"

unsigned long int font[255] ;

void initfont (void) {
   char c ;
   bzero (font, sizeof (font) ) ;

font [ ' ' ] = 00000000000 ;
font [ ' ! ' ] = 01010100010 ;
font [ ' " ' ] = 02424000000 ;
font [ ' # ' ] = 02476247624 ;
font [ ' $ ' ] = 03650301274 ;
font [ ' % ' ] = 04204102042 ;
font [ ' & ' ] = 00000000000 ;
font [ ' \' ' ] = 01010000000 ;
font [ ' ( ' ] = 00410101004 ;
font [ ' ) ' ] = 01004040410 ;
font [ ' * ' ] = 05234763452 ;
font [ ' + ' ] = 00010342000 ;
font [ ' , ' ] = 00000001020 ;
font [ ' - ' ] = 00000340000 ;
font [ ' . ' ] = 00000000010 ;
font [ ' / ' ] = 00204102040 ;
font [ ' 0 ' ] = 03446526234 ;
font [ ' 1 ' ] = 01030101034 ;
font [ ' 2 ' ] = 03442142076 ;
font [ ' 3 ' ] = 07402340274 ;
font [ ' 4 ' ] = 04444760404 ;
font [ ' 5 ' ] = 07640740274 ;
font [ ' 6 ' ] = 03440744234 ;
font [ ' 7 ' ] = 07604102040 ;
font [ ' 8 ' ] = 03442344234 ;
font [ ' 9 ' ] = 03442360234 ;
font [ ' : ' ] = 00010001000 ;
font [ ' ; ' ] = 00010001020 ;
font [ ' < ' ] = 00410201004 ;
font [ ' = ' ] = 00034003400 ;
font [ ' > ' ] = 02010041020 ;
font [ ' ? ' ] = 03442040010 ;
font [ ' @ ' ] = 00000000000 ;
font [ ' A ' ] = 03442764242 ;
font [ ' B ' ] = 07442744274 ;
font [ ' C ' ] = 03442404234 ;
font [ ' D ' ] = 07422222274 ;
font [ ' E ' ] = 07640704076 ;
font [ ' F ' ] = 07640704040 ;
```

FIGURE 6

```
font [ 'G' ] = 03640464236 ;
font [ 'H' ] = 04242764242 ;
font [ 'I' ] = 03410101034 ;
font [ 'J' ] = 01604042434 ;
font [ 'K' ] = 04450605044 ;
font [ 'L' ] = 04040404076 ;
font [ 'M' ] = 04266524242 ;
font [ 'N' ] = 04262524642 ;
font [ 'O' ] = 03442424234 ;
font [ 'P' ] = 07442744040 ;
font [ 'Q' ] = 03442524636 ;
font [ 'R' ] = 07442744442 ;
font [ 'S' ] = 03640340274 ;
font [ 'T' ] = 07610101010 ;
font [ 'U' ] = 04242424234 ;
font [ 'V' ] = 04242422410 ;
font [ 'W' ] = 04242525224 ;
font [ 'X' ] = 04224102442 ;
font [ 'Y' ] = 04224101010 ;
font [ 'Z' ] = 07604102076 ;
for (c = 'a'; c < = 'z'; c++ )
   font [c] = font [c-32] ;
}
```

```
extern unsigned long int font [255 ] ;
void initfont (void) ;
```

FIGURE 8

```c
#include <bstring.h>
#include <stdio.h>
#include <math.h>
#include "initfont.h"
#include "picmaker.h"

#define max( x, y ) ( ( x ) > ( y ) ) ? ( x ) : ( y )
#define DEGRAD (d)  ( d*2*M_PI/360 )

int width, height, xoffset, yoffset ;
long picsize ;
rgb *picture ;
rgb color ;
extern int yydebug ;

#define COL1 ( x ) ( x, r << 16 | x.g << 8 | x.b )
#define  RC ( x, y )  ( x + ( y*width ) )

void plot ( int x, int y ) {
  x + = xoffset ;
  y + = yoffset ;
  if ( ( x > = 0 ) && ( y > = 0 ) && ( x < width ) && ( y < height ) )
    picture [ RC ( x,y ) ] = color ;
} long scrn (int x, int y ) {
  if ( ( x > = 0 ) && ( y > = 0 ) && ( x < width ) && ( y < height ) )
    return COL1 (picture [RC ( x, y ) ] ) ;
  else
    return -1 ;
} void drawchar ( int x, int y, int scale, char c ) {
  unsigned int i, j, k, l ;
  unsigned long int ch, bp ;
  ch = font [ c ] ;
  bp = 04000000000 ;
  for ( i = 0 ; i < 5 ; i + + ) {
    for ( j = 0 ; j < 5 ; j + + ) {
      if ( ch&bp )
        for ( k = 0 ; k < scale ; k + + )
          for ( l = 0 ; l < scale ; l + + )
            plot ( x + j * scale + k, y + 1*scale + 1 ) ;
      bp > > = 1 ;
    }
    bp > > = 1 ;
  }
}
```

FIGURE 9

```
void drawstring ( int x, int y, int scale, char *str ) {
  while ( *str ) {
    drawchar ( x, y scale, (int) *str ) ;
    x + = 6*scale ;
    str + + ;
  }
} void drawline ( int x1, int y1, iny x2, int y2 ) {
  int i, s ;
  float x, y ;
  s = max (abs ( x2 - x1 ), abs ( y2 - y1 ) ) ;
  for (i = 0 ; i < s ; i + + ) {
    x = ( x1 + ( ( float ) ( ( float ) i/s * ( x2 - x1 ) ) ) ;
    y = ( y1 + ( ( float ) ( ( float ) i/s * ( y2 - y1 ) ) ) ;
    plot ( ( int ) x, ( int ) y ) ;
  }
} void vline ( int x, int y1, int y2, int density ) {
  int i ;
  for ( i = y1 ; i < = y2 ; i + + )
    if ( ! ( i%density ))
      plot ( x, i ) ;
} void hline ( int y, int x1, int x2, int density ) {
  int i ;
  for ( i = x1 ; i < = x2 ; i + + )
    if ( ! ( i%density ))
      plot ( i, y ) ;
} void dofill (int x, int y, long c, char *mask ) {
  int bl, br, i, y2 ;
  static 1v = 0 ;
  if ( mask [ RC ( x,y ) ] )
    return ;
  lv + + ;
  for ( br = x; br < width && scrn ( br, y ) = = c ; br+ + ) {
    plot ( br, y ) ;
    mask [RC ( br, y ) ] = 1 ;
  }
```

FIGURE 9 ( cont. )

```
    for ( bl = x - l ; bl >= 0 && scrn ( bl, y ) = = c ; bl - - ) {
      plot ( bl, y ) ;
      mask [RC (br, y ) ] = l ;
    }
  if ( y-1 >= 0 )
      for ( i = bl + l ; i < br ; i ++ ) {
        for ( y2 = y- 1 ; scrn ( i, y2 ) = = c & & !mask [ RC ( i, y2 ) ] ; y2 - - ) ;
        y2 ++ ;
        if ( y2 ! = y )
          dofill ( i, ( y + y2 ) / 2, c, mask ) ;
    }
  if ( y+ l < height )
      for ( i = bl + l ; i < br ; i ++ ) {
        for ( y2 = y+1 ; scrn ( i, y2 ) = = c & & !mask [ RC ( i, y2 ) ] ; y2 ++ ) ;
        y2 - - ;
        if ( y2 ! = y )
          dofill ( i, ( y + y2 + 1 ) / 2, c, mask ) ;
      }
    lv - - ;
  }
void fill (int x, int y ) {
  static char *mask = NULL ;
  statis size ;
  if ( ! mask )
    mask = (char * ) malloc (size = ( width + 1 ) * ( height + 1 ) ) ;
  bzero (mask, size ) ;
  dofill ( x, y, scrn (x, y) , mask ) ;
  } void arc ( int density, int cx, int cy, int r, int sdeg, int edeg ) {
  int len, i, j ;
  double theta, srad, erad ;
  if (sdeg > edeg )
    edeg += 360 ;
  srad = DEGRAD (sdeg) ;
  erad = DEGRAD (edeg) ;
  len = 1.5*r* (erad - srad ) ;
  for (theta = srad ; theta <= erad ; theta += ( erad - srad ) /len )
    for ( i = 0 ; i < density ; i ++ )
      for ( j = 0 ; j < density ; j + + )
        plot ( r*cos (theta ) + cx + i, -r * sin (theta) + cy + j ) ;
  }
```

FIGURE 9 (cont.)

```
void picout ( void ) {
    int i, j ;
    printf ( " P6\n%d %d\n255\n " , width, height ) ;
    for ( i = 0 ; i < height; i ++ )
        for ( j = 0; j < width ; j ++ ) {
            putchar ( picture [ j + ( i*width) ] .r ) ;
            putchar ( picture [ j + ( i*width) ] .g ) ;
            putchar ( picture [ j + ( i*width) ] .b ) ;
        }
}
int main ( ) {
    initfont ( ) ;
    color.r = color.g = color.b = 255 ;
    yyparse ( ) ;
    picout ( ) ;
}
```

FIGURE 9 (cont.)

```
typedef struct  {
   unsigned char r, g, b ;
} rgb ;

extern int width, height, xoffset, yoffset ;
extern long picsize ;
extern rgb *picture ;
extern rgb color ;
extern int yydebug ;
```

FIGURE 10 init 100, 100 ——— 1101
color = 127, 127, 127 ——— 1102
fill 50, 50 ——— 1103

\# Outside border color = 0, 0, 0
vline 0, 99 at 0
vline 0, 99 at 1
vline 0, 99 at 2
vline 0, 99 at 3
hline 0, 99 at 0
hline 0, 99 at 1
hline 0, 99 at 2    } 1104
hline 0, 99 at 3
vline 0, 99 at 99
vline 0, 99 at 98
vline 0, 99 at 97
vline 0, 99 at 96
hline 0, 99 at 99
hline 0, 99 at 98
hline 0, 99 at 97
hline 0, 99 at 96

\# Label border
color = 0, 0, 0
vline 30, 50 at 20
hline 20, 80 at 30
color = 200, 200, 200   } 1105
vline 30, 50 at 80
hline 20, 80 at 50
fill 50, 40

\# Drawer handle
color = 0, 0, 0
plot 30, 70, to 40, 80
plot 40, 80, to 60, 80
plot 60, 80, to 70, 70
plot 70, 70, to 65, 70   } 1106
plot 65, 70, to 60, 75
plot 60, 75, to 40, 75
plot 40, 75, to 35, 70
plot 35, 70, to 30, 70 color = 255, 255, 0
fill 35, 72 color = 0, 0, 0         } 1107
draw "some text " at 24, 38

SERVER TO DYNAMICALLY GENERATE GRAPHICS FOR THE WORLD WIDE WEB

FIELD OF THE INVENTION

The invention generally relates to client-server network environments such as the World Wide Web or private "Intranets", and more particularly relates to dynamically generating graphics in such environments.

PRIOR ART

In the so-called information age, information that used to take weeks to search and retrieve is now available contemporaneously at our fingertips. The proliferation of client-server networks such as the Internet, and in particular the World Wide Web (hereinafter the Web), makes a large amount of information accessible to anyone connected to the Internet. So-called "Intranets," which are essentially smaller, private versions of the Web, are also proliferating rapidly in many industries. In general except where otherwise noted, the discussion herein applies equally to the Web and to Web-like Intranets.

In general, the layout language for a Web document is Hypertext Markup Language (HTML). Each Web document is given a "Uniform Resource Locator" (URL) which is essentially an address path identifying the server which hosts the desired document plus the location of the document on the server. Using "browser" software such as Netscape™ Navigator, an end-user can send a request from a client computer to access a document stored at a particular URL. When the server receives the user's request, it sends the requested HTML Web document to the client where the document can be displayed. The communications protocol used in making such a request and in transferring Web documents is "Hypertext Transfer Protocol" (HTTP). For more information about the Web, see for example T. Berners-Lee, R. Cailliau, A. Loutonen, H. F. Nielsen, and A. Secret, "The World Wide Web," Communications of the ACM, vol. 37(8), August 1994.

HTML allows any Web document to include hypertextual "links" to other Web documents including graphical images. The effect of a hypertextual link, as well known by practitioners of the art, is that when the document containing the link is displayed to an end-user at a client computer, the end-user can access the linked document by pointing and selecting a corresponding icon or highlighted text in the displayed document, a graphics image that has already been created and stored in a graphic file is retrieved and sent over the Web to the requested end-user for display.

However, there are instances in which graphics images generated in real-time or dynamically may be desirable. For example, an end-user may want a real-time financial data graph from currently available data, or a test graph while the test is still ongoing, etc. In that case, the end-user sends a special request to the server which retrieves the data and generates the requested graphics in real-time. The graphic is then sent to the end-user over the Web.

Currently, to generate graphics from the data received, the server executes a stored software program written by the content author (i.e., the web developer) in a popular high-level programming language such as C. However, the graphics generating software program is written for, and hence limited to a specific application. In addition, a certain level of proficiency with the high-level programming language is needed to write such a program.

Thus, a need exists for a Web server adapted to allow customized graphical images to be created dynamically and easily for transmitting over the Web.

SUMMARY OF THE INVENTION

Accordingly, the present invention provides a server that is adapted to allow customized graphical images to be created dynamically and easily for transmitting over the Web.

The present invention meets the above need with a server that is coupled to a client-server network supporting hypertextual protocol and adapted to allow general purpose graphics generating programs of wide application to be easily developed and modified without much prior familiarity knowledge. The server comprises a system bus, a CPU coupled to the system bus, and a graphical image generating means coupled to the system bus.

The graphical image generating means comprises: means for accessing a plurality of computer graphics instructions which are written in a general purpose computer graphics language, an interpreter for interpreting the computer graphics instructions and graphical parameters received from a data source, and means that is responsive to the interpreter for generating the graphical image in accordance with a uniform protocol of the client-server network. In response to a request from a client computer of the network, the graphical image generating means dynamically accesses the computer graphics instructions that is developed or modified by the user, interprets the computer graphics instructions with data parameters, and generates the graphical image.

All the features and advantages of the present invention will become apparent from the following detailed description of its preferred embodiment whose description should be taken in conjunction with the accompanying drawings.

BRIEF DESCRIPTION OF THE DRAWINGS

FIG. 3 is an illustration of the lex programming codes for lexical analyzer file lex.l.

FIG. 4 is an illustration of the yacc programming codes for parser file parser.y.

FIG. 5 is an illustration of the programming codes for program file makefile.

FIG. 6 is an illustration of the C programming codes for program file initfont.c.

FIG. 7 is an illustration of the binary representation of the character "B".

FIG. 8 is an illustration of the C programming codes for header file initfont.h.

FIG. 9 is an illustration of the C programming codes for program file picmaker.c.

FIG. 10 is an illustration of the C programming codes for header file picmaker.h.

FIG. 11 is an illustration of an exemplary Picmaker graphics generating program.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
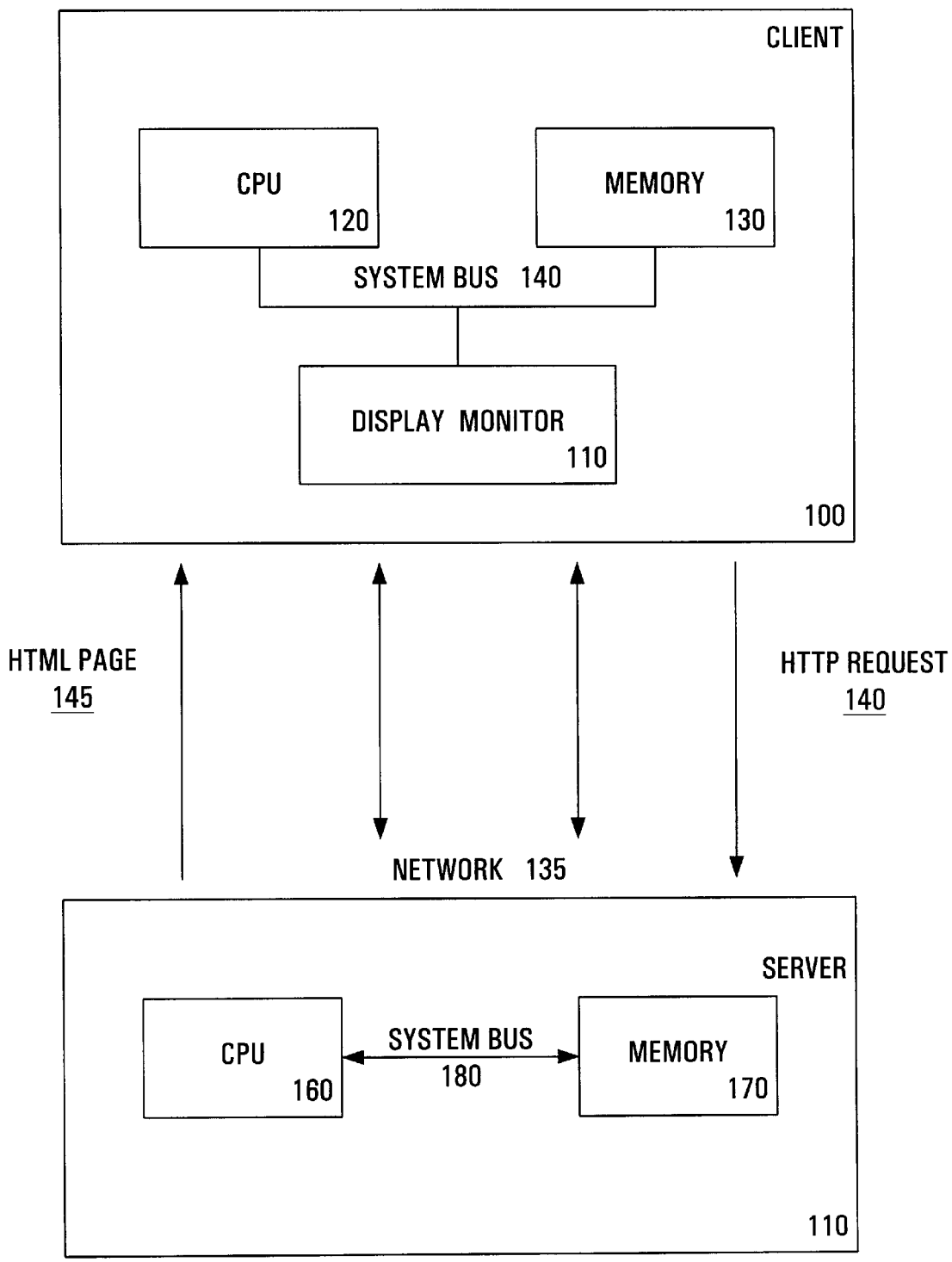
FIG. 1 is an illustration of a high level architectural view of a Web connection between a client computer and a web server.

Reference is made to FIG. 1 illustrating a high level architectural view of a Web connection between a client computer and a server computer. In FIG. 1, client computer 100 consists of CPU 120, memory 130, and display monitor 110 which are connected together by system bus 140. Memory 130 stores browser software to communicate to server computer 150. It will be understood by a person of ordinary skill in the art that client computer 100 can also include other elements not shown in FIG. 1 such as disk drives, keyboard, etc. Server computer 150, on the other hand, includes CPU 160 and memory 170 which are connected together by system bus 180. Memory 170 stores HTTP server software as well as the instruction codes in accordance with the present invention. A person of ordinary skill in the art will understand that memories 130 and 170 may also contain additional information such as applications programs, network communication programs (e.g., TCP/IP protocol), operating system software, data, etc. Client computer 100 and server computer 150 are linked together by network 135.

In an exemplary exchange, an end-user uses client computer 100 to execute the browser program stored in memory 130 to request, retrieve, and display network documents (e.g., Web pages). Each request by client computer 100 for retrieval of a network document is formulated in accordance with the network protocol (e.g., HTTP) and transmitted across network 135 to server computer 150. Server computer 150 receives HTTP requests such as request 140 and processes them using the HTTP server software (e.g., standard network server software) stored in memory 170. The HTTP server software of computer 100 then instructs CPU 160 to retrieve HTML page 145 from data stored in memory 170 and to transmit a copy of Web page 145 back to client computer 100 for display on monitor 110.

In accordance with the present invention, Web page 145, when displayed, includes a hypertextual icon or highlighted text that, upon being clicked-on by the end-user, results in the end-user's browser sending another request to CPU 160 to execute a software program stored in memory 170 to dynamically generate graphics. As described earlier, the general mechanism of hypertextual linkage is well-known and common with HTML Web pages.

Figure 2:
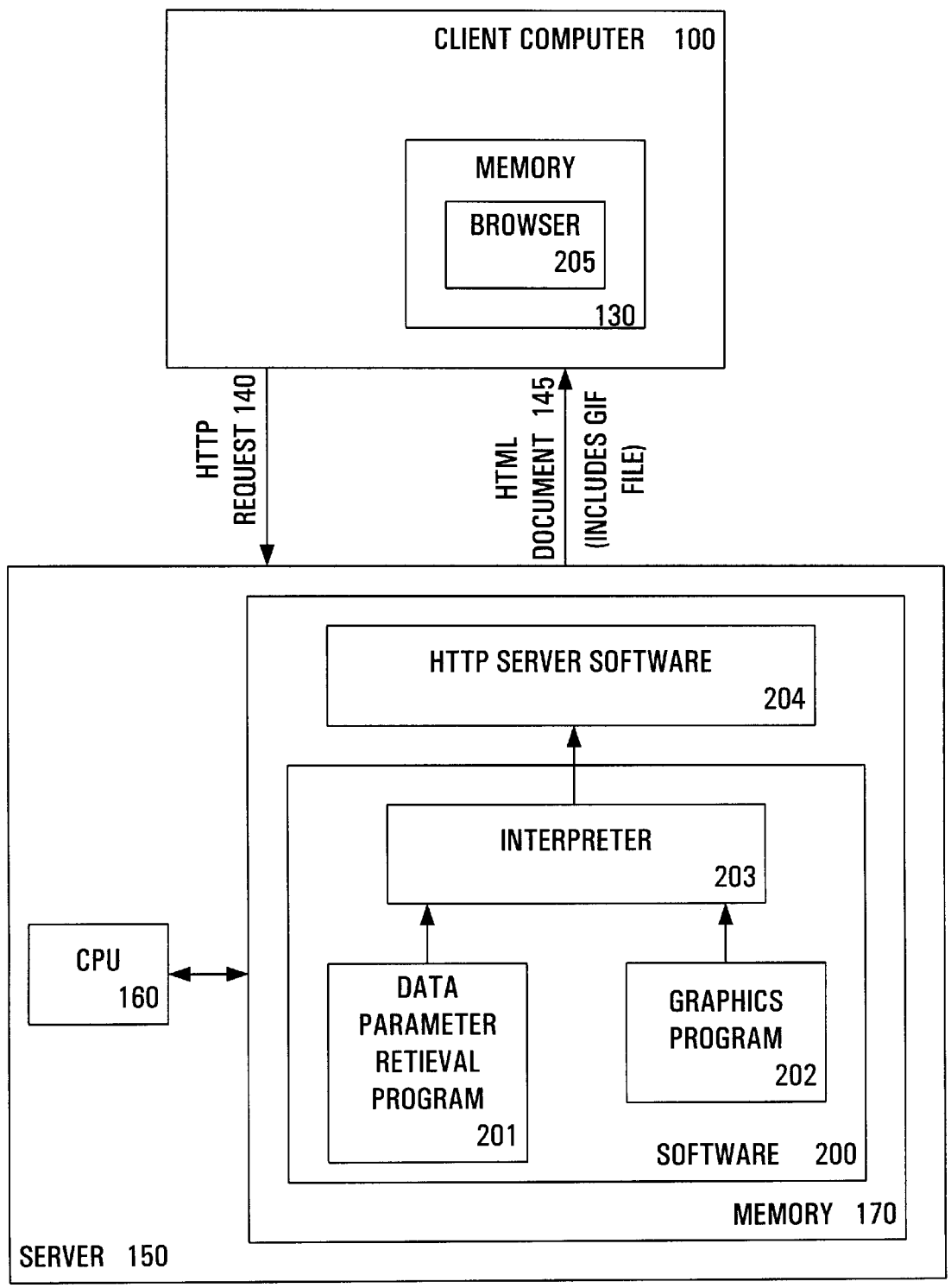
FIG. 2 is an illustration of the modules of the software program relative to the Web connection between client computer 100 and server 150 as shown in FIG. 1 in accordance to the present invention.

FIG. 2 illustrates a high level architectural view of the present invention relative to the Web connection between client computer 100 and server 150 as shown in FIG. 1. In particular, FIG. 2 illustrates the modules of the software program to dynamically generate graphics on the Web in accordance to the present invention. The software modules of program 200 include data parameters retrieval program 201, graphics program 202, and an interpreter 203. Data parameters retrieval program 201 is designed to retrieve data in real time from a data source (e.g., from direct user input or from a continuously updated data base). It should be clear to a person of ordinary skill in the art that this software module is common and can easily be developed. Graphics program 202 is developed to be used together with the data parameters retrieved by data parameters retrieval program 201 to generate graphics dynamically. In the preferred embodiment, graphics program 202 is written in the Picmaker programming language which is further discussed below. As a programming language, Picmaker offers flexibility and ease of programming thereby allowing graphics programs that are fully generalizable to any graphics application for the Web to be written. As such, graphics program 202 can be easily written and/or modified to suit any Web graphics application. The computer instructions in graphics program 202 specify images to be generated.

Preferably, access to graphics program 202 is made available on-line to the user at client computer 100 to allow programming instructions to be changed and modified by the user for customization purpose. This revised graphics program 202 is then transmitted back to server 150 for execution in place of the original graphics program 202. Alternately, graphics program 202 can be written by a user on client computer 100 and sent to server 150, in response to a prompt from server 150 for the filename and its path, together with the request for dynamically generated graphical image. It should be clear to a person of ordinary skill in the art that providing the user on-line access to a program for modification and programming purpose and allowing the user to upload a program to the server are well-known and can be easily accomplished.

Interpreter 203 is developed to interpret the commands of the Picmaker programming language for CPU 160 thereby allowing CPU 160 to carry out the instructions of graphics program 202. Based on the commands provided by graphics program 202 and data parameters provided by data parameters retrieval program 201, interpreter 203 generates a Portable Pixmap (PPM) file which is a public domain format. The PPM file can then be converted into a GIF image using a PPM-to-GIF filter which is available in the public domain. Interpreter 203 is further discussed below.

Operationally, in response to HTTP request 205 from client computer 100 generated by the clicking of a hypertextual icon or highlighted text on the Web page provided by server 150, data parameters retrieval program 201 first downloads data from a data source such as a continuously updated data base or from direct user input. The data is stored in a specially formatted input file. The downloaded data and commands from graphics program 202 are supplied as input to interpreter 203 which, with the help of CPU 160, generates the desired graphics in the form of PPM file. The PPM file is converted into a GIF image. Next, the GIF image is provided to HTTP server software 204. HTTP server software 204 sends the GIF image to client computer 100 as a HTML document 206. Thus, the current invention describes a modular apparatus that is capable of dynamically generating any generalized graphics application for the Web.

Programming language Picmaker is discussed next. The syntax of programming language Picmaker is listed in Table 1.

TABLE 1 init *width, height*
arc *center-x, center-y, radius, start-degree, end-degree*
arc *(width) center-x, center-y, radius, start-degree, end-degree*
circle *center-x, center-y, radius, start-degree, end-degree*
circle *(width) center-x, center-y, radius*
color = *r, g, b*
draw "*string*" at *x, y*
draw *(size)* "*string*" at *x, y*
fill *x, y*
hline *x1, x2* at *y*
vline *y1, y2* at *x*
hline *(density) x1, x2* at *y*

TABLE 1-continued vline (density) y1, y2 at x
origin x, y
plot x1, y1
plot x1, y1 to x2, y2

The command init requires two parameters width and height. Init sets up a rectangle with the dimensions width and height and clears it all out to black. The origin (0, 0) is initialized to the upper-left corner.

The command arc center-x, center-y, radius, start-degree, end-degree requires parameters center-x, center-y, radius, start-degree, end-degree. It draws an arc with a center point of (center-x, center-y), a radius of radius pixels, starting at start-degree, and going counterclockwise to end-degree. On the other hand, the command arc (width) center-x, center-y, radius, start-degree, end-degree draws an arc as above but with a line width that is width pixels wide.

The command circle center-x, center-y, radius requires parameters center-x, center-y, radius. It draws a circle with a center point of (center-x, center-y) and a radius of radius. The command circle (width) center-x, center-y, radius requires parameters width, center-x, center-y, radius. It draws a circle with a center point of (center-x, center-y) and a radius of radius but with a line width that is width pixels wide.

The command color=r, g, b requires three parameters r, g, and b. It sets the current color wherein r, g, b are values between 0 and 255 levels of red, green, and blue respectively.

The command draw "string" at x, y requires two parameters x and y. It writes the text specified by string starting at coordinate axes (x, y). The command draw (size) "string" at x, y requires parameters size, string, x, and y. It writes the text specified by string starting at coordinate axes (x, y) but magnified size times.

The command fill x, y requires parameters x and y. It fills an area with the current color starting at coordinate axes (x, y).

The command hline x1, x2 at y requires parameters x1, x2, and y. It draws a horizontal line between two points (x1, y) and (x2, y). The command vline y1, y2 at x requires parameters y1, y2 and x. It draws a vertical line between two points (x, y1) and (x, y2).

Likewise, the command hline (density) x1, x2, at y requires parameters density, x1, x2, and y. It draws a dotted horizontal line between two points (x1, y) and (x2, y) since it only draws every density pixels. The command vline (density) y1, y2, at x requires parameters density, y1, y2, and x. It draws a dotted vertical line between two points (x, y1) and (x, y2) since it only draws every density pixels.

The command origin x, y requires two parameters x and y. It changes the origin of the graphics to the absolute position x, y. In other words, an origin command which follows another origin command will not reset the origin relative to the first. Rather, it will always reset the origin relative to the upper-left corner (i.e., coordinate axes (0, 0)).

The command plot x, y requires parameters x and y. It draws a point (x, y) in the current color. The command plot x1, y1 to x2, y2 requires parameters x1, y1, x2, and y2. It draws a line vector from point (x1, y1) to (x2, y2).

In accordance with the present invention, a Picmaker programming language interpreter is written and stored in memory 170 of server 150 to interpret the commands listed in Table 1. An interpreter may be a common gateway interface (CGI) program that outputs a file in HTML language. In the preferred embodiment, the interpreter is written in C programming language. The interpreter consists of the following programming files lex.l, parser.y, makefile, initfont.c, initfont.h, picmaker.c, and picmaker.h. Generally, a programming language interpreter consists of three main parts: a lexical analyzer, a parser, and a dictionary. For programming language Picmaker, files lex.l, parser.y, and picmaker.c represent the lexical analyzer, the parser, and the dictionary, respectively. Discussion on programming language development can be found, for example, in John Levine, Tony Mason, and Doug Brown, "Lex & Yacc" (2d ed. 1992) which is herein incorporated by reference as background material.

Reference is now made to FIG. 3 illustrating the lex programming codes for lexical analyzer file lex.l. A lexical analyzer is a program written to define the lexemes used in the programming language. Similar to words in natural language, lexemes are fundamental building blocks that make up the programming language. Lexical analyzer program lex.l defines all the lexemes that are used in the programming language Picmaker namely "num", "strlit", "line", "Hline", "Vline", "Plot", "At", "Init", "Color", "Fill", "Arc", "Circle", and "Origin". As an example, to define the lexeme "Hline", lexical analyzer program lex.l first define the lexeme "line" which can be constructed by a combination of either upper or lower case letter "l" (i.e., [Ll]), either upper or lower case letter "i" (i.e., [Ii]), either upper or lower case letter "n" (i.e., [Nn]), and either upper or lower case letter "e" (i.e., [Ee]). The lexeme "line" is then combined with either upper case or lower case letter "h" (i.e., [Hh]) to become the lexeme Hline. Other lexemes are defined in a similar fashion. It should be clear to a person of ordinary skill in the art that other lexemes can easily be added to lexical analyzer program lex.l.

FIG. 4 illustrates the yacc programming codes for parser file parser.y. A parser file is written to combine the lexemes defined in the lexical analyzer program to create valid sentences in the programming language. While sentences consist of words in natural language, sentences consist of lexemes in programming languages. Parser program parser.y defines all the valid combinations of lexemes (i.e., sentences) that make up the commands of programming language Picmaker listed in Table 1. As an example, the lexeme "Plot" is combined with two lexemes "Num" separated by a comma character to create the sentence "Plot Num ',' Num". This sentence is used to communicate the command "Plot x, y" which draws a point at (x, y). Other sentences are created in a similar fashion.

FIG. 5 illustrates the programming codes for program file Makefile. In essence, a Makefile is used to provide the computer/CPU with a list of files, modules, and subprograms needed to compile a program. An analogy for Makefile is a recipe for a dish.

Figure 7:
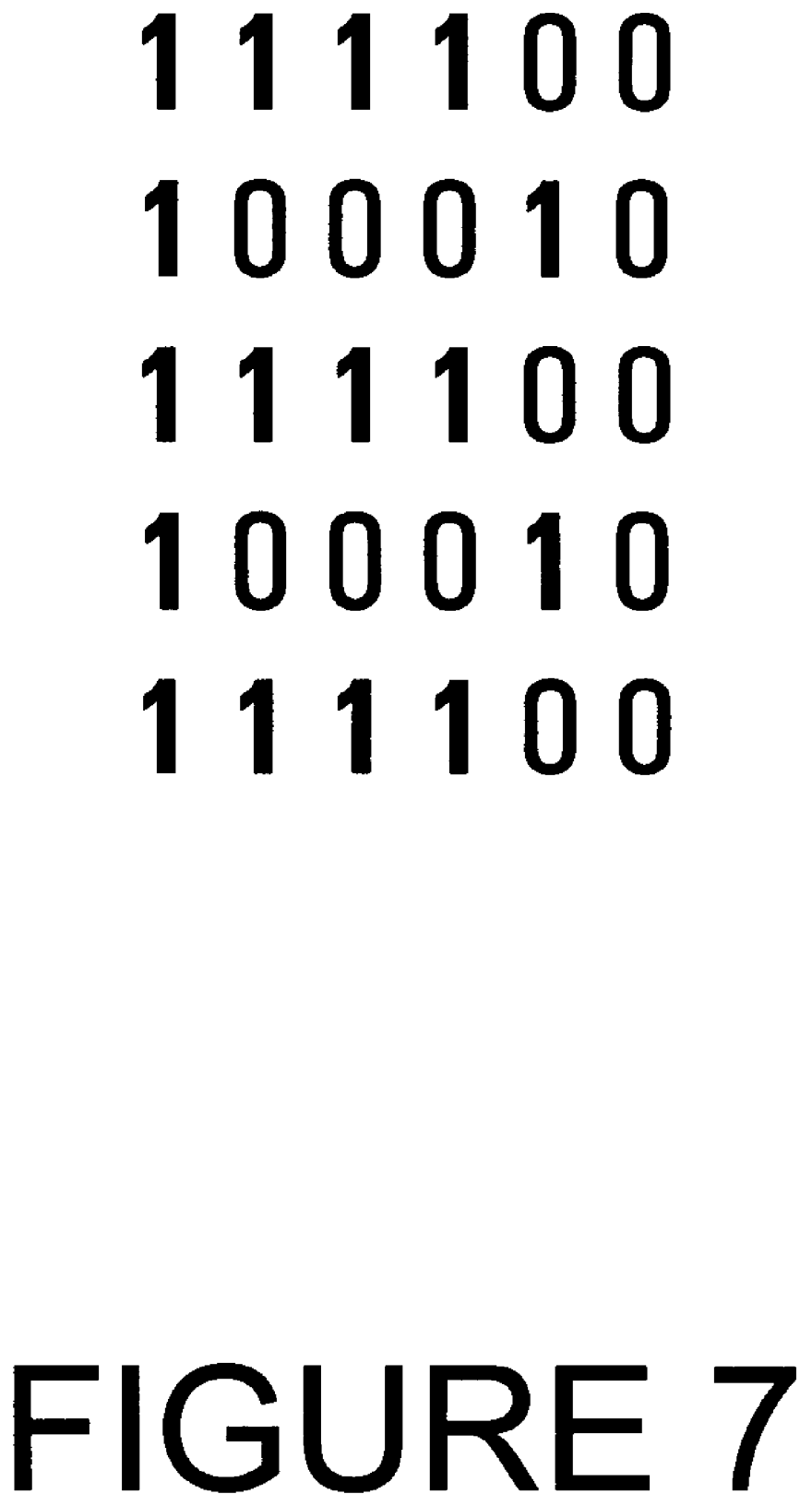

Referring now to FIG. 6 illustrating the C programming codes for initfont.c. Initfont.c is a program module for the programming language Picmaker and assigns a bitmap picture to each computer keyboard character. For example, the character "B" is given a bitmap picture having a 3-bit binary notation value of 07442744274. For reference, the binary equivalent of this value is 000 111 100 100 010 111 100 100 010 111 100. Referring now to FIG. 7 which illustrates the above binary representation for the character B. As shown, the one's (1's), which are highlighted for emphasis, form the character B. In assigning a bitmap picture to each computer keyboard character, the characters can be treated and generated as graphics.

FIG. 8 illustrates the C programming codes for header file initfont.h. Header file initfont.h defines an array having 255 elements and links program module initfont.c to this array. In so doing, the contents of program module initfont.c are indexed and can easily be retrieved in much the same way a library catalog index the book titles and their locations.

FIG. 9 illustrates the C programming codes for dictionary file picmaker.c. Program file picmaker.c provides the meaning to the command sentences created in parser file parser.y above by listing the C programming codes associated with each command. In other words, for each command, picmaker.c provides the programming steps utilizing the supplied command parameters to accomplish the goal of the command. As an example, take the command "Plot x, y" which draws a point having coordinate axes (x, y) in the current color. The C programming codes to carry out this command include:

x+=xoffset; incrementing the x value by xoffset to ; take into account the origin of the graph y+=yoffset; incrementing the y value by yoffset to ; take into account the origin of the graph if ((x>=0) && (y>=0) && (x<width) && (y<height)) picture[RC(x,y)]=color ; if x and y are within the defined boundary ; then set point (x, y) to the current color Finally, reference is made to FIG. 10 illustrating the C programming codes for the header file picmaker.h. Picmaker.h basically defines the types (i.e., integer, real) of the variables used in the dictionary file picmaker.c.

Figure 12:
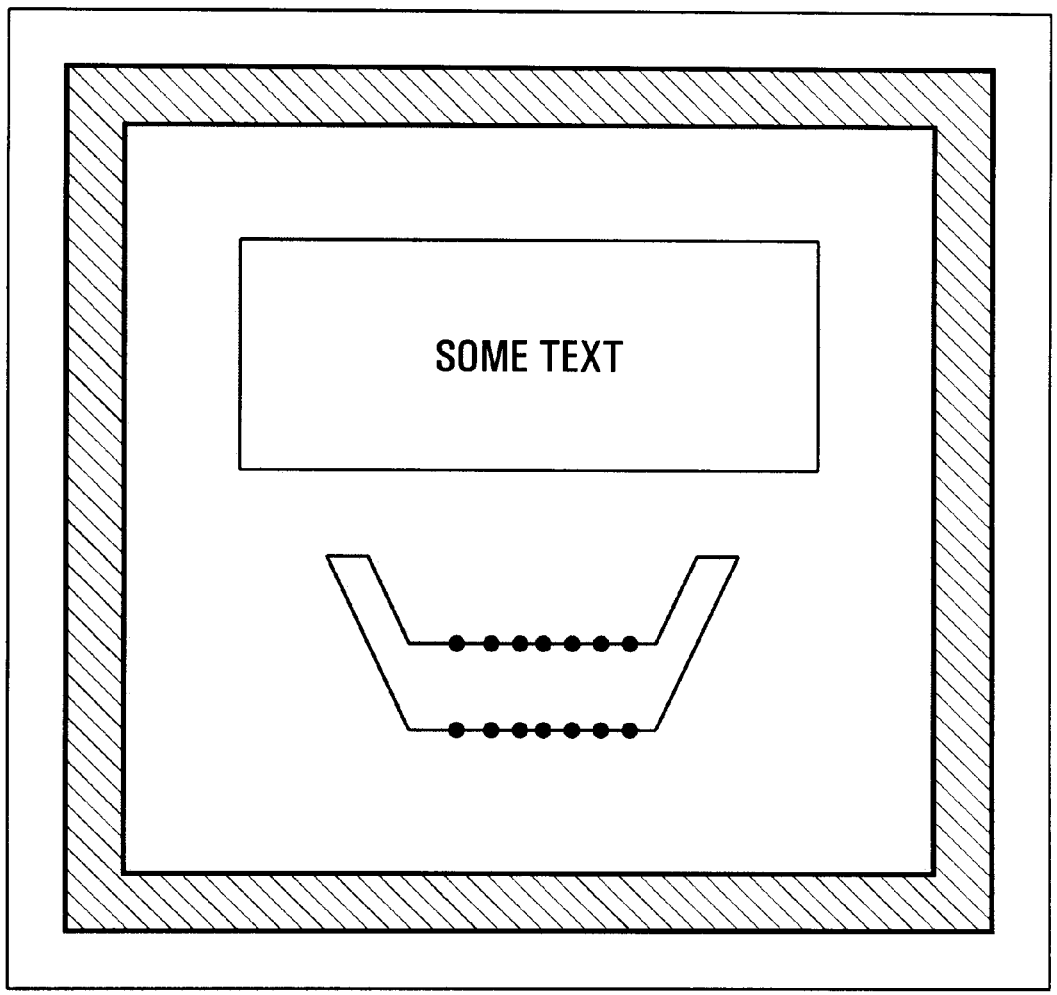
FIG. 12 is an illustration of a graphic generated by the exemplary Picmaker program shown in FIG. 10.

Reference is now made to FIG. 11 which illustrates, as examples, a Picmaker program to generate the file drawer illustrated in FIG. 12. In FIG. 11, instruction codes 1101, 1102, and 1103 correspond to an init command, a color command, and a fill command respectively. Instruction code 1101 reserves a rectangular area of 100 pixels by 100 pixels for the drawer. Instruction code 1102 sets the RGB color values for the drawer to 127, 127, and 127. Instruction code 1103 fills the background with the current color starting at coordinate (50, 50).

Instruction codes 1104 are used to generate the outside border of the drawer in FIG. 12. Accordingly, instruction codes draw a series of vertical and horizontal lines. For example, the instruction "vline 0,99 at 0" indicates that a vertical line is drawn between two points (0,0) and (0, 99). The vertical and horizontal lines color is set at 0, 0, 0.

Instruction codes 1105 are used to generate the label border (i.e., the text border) of the drawer in FIG. 12. As shown, instruction codes 1105 also draw a series of vertical and horizontal lines. However, the color of vline 30, 50 at 20 and hline 20, 80, at 30 is different from the color of vline 30, 50 at 80 and hline 20, 80, at 50.

Instruction codes 1106 are used to generate the drawer handle. Instruction codes 1106 includes a series of vector lines. For example, the instruction "plot 0, 70 to 40, 80" indicates that a line is draw between points (30, 70) and (40, 80). Finally, instruction codes 1107 are used to write the string of text "some text" starting at point (24, 38). The text color is set at 0,0,0.

As demonstrated above, a typical Picmaker program is very simplistic in its format and construction. Moreover, given the few number of commands in Picmaker and their straight forward characteristics, it is clear that a graphics program in the Picmaker programming language can easily be developed. As such, by allowing user access to modify and rewrite the instructions in a Picmaker graphics program, graphical images can easily be customized as desired by the user. Similarly, graphical images can also be customized by allowing the user on client computer to write his own Picmaker graphics program and upload it to server 150. As an example, the drawer shown in FIG. 12 can be redrawn and new text added to the user's liking by making changes to graphics program 202.

An apparatus to dynamically generate graphics for the Web is demonstrated above. The apparatus is unique and novel in that it has a modular and interpretive architecture that allows graphics programs that are fully generalizable to any graphics application on the Web to be easily developed.

The preferred embodiment of the present invention, a server storing instruction codes to dynamically generate graphics for transmission over the Web, is thus described. While the present invention has been described in particular embodiments, the present invention should not be construed as limited by such embodiments, but rather construed according to the below claims.

What is claimed is:

1. A method for dynamically generating graphical images using a graphics program on a server in a client-server computer network, the method comprising the following steps:

allowing an original version of the graphics program to be accessed from a client computer via the client-server computer network;

allowing the original version of the graphics program to be revised from the client computer using a syntax of a general purpose computer graphics language:

receiving a revised version of the graphics program from the client computer via the client-server computer network;

receiving a request for a graphical image from the client computer via the client-server computer network;

in response to the request, executing the revised version of the graphics program in place of the original version of the graphics program;

interpreting the syntax used by the revised version of the graphics program;

generating the graphical image based on the interpreting step; and transmitting the graphical image to the client computer.

2. The method of claim 1, further comprising the step of dynamically accessing one or more graphical parameters from a data source in response to the request, and wherein the step of interpreting further comprises interpreting the graphical parameters.

3. The method of claim 1, wherein the syntax of the general purpose computer graphics language includes an arc-center command for drawing an arc of a specified angle, with a specified center point.

4. The method of claim 1, wherein the syntax of the general purpose computer graphics language includes an init command for initializing an area where the graphical image is created.

5. The method of claim 1, wherein the syntax of the general purpose computer graphics language includes a circle-center command for drawing a circle of a specified radius around a given centerpoint.

6. The method of claim 1, wherein the syntax of the general purpose computer graphics language includes a color command for specifying a drawing color.

7. The method of claim 1, wherein the syntax of the general purpose computer graphics language includes a draw-text command for drawing text.

8. The method of claim 1, wherein the syntax of the general purpose computer graphics language includes a fill command for applying color to a specified region in an area where the graphical image is created.

9. The method of claim 1, wherein the syntax of the general purpose computer graphics language includes a horizontal line command for drawing a horizontal line.

10. The method of claim 1, wherein the syntax of the general purpose computer graphics language includes a vertical line command for drawing a vertical line.

11. The method of claim 1, wherein the syntax of the general purpose computer graphics language includes a define origin command for specifying a point having coordinates (0,0).

12. The method of claim 1, wherein the syntax of the general purpose computer graphics language includes a plot-point command for plotting a point.

13. The method of claim 1, wherein the syntax of the general purpose computer graphics language includes a plot-line command for drawing a vector between two points.

14. The method of claim 1, wherein the step of interpreting is performed using a common gateway interface program ("CGI").

15. The method of claim 1, wherein the client-server computer network supports hypertext transfer protocol ("http").

16. A system for dynamically generating graphical images using a graphics program on a server in a client-server computer network, the system comprising:

a client computer adapted to access the original version of the graphics program and to process revisions to the original version of the graphics program using a syntax of a general purpose computer graphics language; and a server communicatively coupled to the client computer via the client-server computer network, the server adapted to receive a revised version of the graphics program, receive a request for a graphical image, execute the revised version of the graphics program in place of the original version of the graphics program, interpret the syntax used by the revised version of the graphics program, generate the graphical image, and transmit the graphical image to the client computer.

17. The system of claim 16, wherein the syntax of the general purpose computer graphics language includes an arc-center command for drawing an arc of a specified angle, with a specified center point.

18. The system of claim 16, wherein the syntax of the general purpose computer graphics language includes an init command for initializing an area where the graphical image is created.

19. The system of claim 16, wherein the syntax of the general purpose computer graphics language includes a circle-center command for drawing a circle of a specified radius around a given centerpoint.

20. The system of claim 16, wherein the syntax of the general purpose computer graphics language includes a color command for specifying a drawing color.

21. The system of claim 16, wherein the syntax of the general purpose computer graphics language includes a draw-text command for drawing text.

22. The system of claim 16, wherein the syntax of the general purpose computer graphics language includes a fill command for applying color to a specified region in an area where the graphical image is created.

23. The system of claim 16, wherein the syntax of the general purpose computer graphics language includes a horizontal line command for drawing a horizontal line.

24. The system of claim 16, wherein the syntax of the general purpose computer graphics language includes a vertical line command for drawing a vertical line.

25. The system of claim 16, wherein the syntax of the general purpose computer graphics language includes a define origin command for specifying a point having coordinates (0,0).

26. The system of claim 16, wherein the syntax of the general purpose computer graphics language includes a plot-point command for plotting a point.

27. The system of claim 16, wherein the syntax of the general purpose computer graphics language includes a plot-line command for drawing a vector between two points.

* * * * *